UNITED STATES PATENT OFFICE.

ERNST FABRA, OF COVINGTON, KENTUCKY.

IMPROVEMENT IN MEDICAL COMPOUNDS FOR THE CURE OF CHOLERA IN HOGS, &c.

Specification forming part of Letters Patent No. 132,204, dated October 15, 1872.

*To all whom it may concern:*

Be it known that I, ERNST FABRA, of Covington, in the county of Kenton and State of Kentucky, have invented a certain new and useful Cure for Cholera in Hogs and Cattle, of which the following is a specification:

The component ingredients of my remedy are as follows, to wit: Chinæ sulphur, twenty grains; tincture ferrum chloratum, three ounces; tincture cinnamon, six drams; aqua destillata, six ounces.

The proportions above given may be slightly altered, or the tincture of cinnamon left out, or the amount of water varied somewhat, if desired, without destroying my compound, the essential parts of which are the Chinæ sulphur and the tincture ferrum chloratum in about the proportions above set forth. The manner, also, in which this remedy is compounded is not essential.

The manner in which I usually administer this remedy is to take a teaspoonful for each hog, or a table-spoonful for each head of cattle, and dilute it with water, and then mix it in the food of the animal.

This medicine may not only be used as a cure, but also as a preventive, in which case it is administered in the ordinary doses about three times a year.

What I claim as my invention is—

1. A compound of about twenty grains of Chinæ sulphur with about three ounces tincture ferrum chloratum, substantially as described.

2. A compound of about twenty grains Chinæ sulphur, about three ounces tincture ferrum chloratum, and about six drams tincture cinnamon, substantially as set forth.

3. A compound of about twenty grains of Chinæ sulphur and about three ounces tincture ferrum cloratum with about six drams of tincture cinnamon and six ounces (more or less) of aqua destillata, substantially as and for the purposes set forth.

ERNST FABRA.

Witnesses:
JOHN E. HATCH,
JEREMIAH F. TWOHIG.